(12) United States Patent
Lucangeli Obes et al.

(10) Patent No.: US 8,490,196 B2
(45) Date of Patent: Jul. 16, 2013

(54) SYSTEM AND METHOD FOR EXTENDING AUTOMATED PENETRATION TESTING TO DEVELOP AN INTELLIGENT AND COST EFFICIENT SECURITY STRATEGY

(75) Inventors: Jorge Lucangeli Obes, Buenos Aires (AR); Carlos Emilio Sarraute Yamada, Buenos Aires (AR); Gerardo Gabriel Richarte, Buenos Aires (AR)

(73) Assignee: Core Security Technologies, Boston, MA (US)

( * ) Notice: Subject to any disclaimer, the term of this patent is extended or adjusted under 35 U.S.C. 154(b) by 246 days.

(21) Appl. No.: 12/851,516

(22) Filed: Aug. 5, 2010

(65) Prior Publication Data

US 2011/0035803 A1 Feb. 10, 2011

Related U.S. Application Data

(60) Provisional application No. 61/231,669, filed on Aug. 5, 2009, provisional application No. 61/362,511, filed on Jul. 8, 2010.

(51) Int. Cl.
*G06F 11/00* (2006.01)
*G06F 12/14* (2006.01)
*G06F 12/16* (2006.01)
*G08B 23/00* (2006.01)

(52) U.S. Cl.
USPC .............................................. 726/25; 726/23

(58) Field of Classification Search
USPC ........................................................ 726/25
See application file for complete search history.

(56) References Cited

U.S. PATENT DOCUMENTS

| 5,392,382 | A | 2/1995 | Schoppers | |
|---|---|---|---|---|
| 6,574,737 | B1* | 6/2003 | Kingsford et al. | 726/25 |
| 6,785,821 | B1* | 8/2004 | Teal | 726/23 |
| 7,003,561 | B1* | 2/2006 | Magdych et al. | 709/223 |
| 7,152,105 | B2* | 12/2006 | McClure et al. | 709/224 |
| 7,194,769 | B2* | 3/2007 | Lippmann et al. | 726/25 |
| 7,228,566 | B2 | 6/2007 | Caceres et al. | |
| 7,243,148 | B2* | 7/2007 | Keir et al. | 709/224 |
| 7,257,630 | B2* | 8/2007 | Cole et al. | 709/224 |
| 7,295,831 | B2* | 11/2007 | Coleman et al. | 455/410 |
| 7,543,056 | B2* | 6/2009 | McClure et al. | 709/224 |
| 7,594,273 | B2* | 9/2009 | Keanini et al. | 726/25 |
| 7,620,989 | B1* | 11/2009 | Couturier et al. | 726/23 |
| 7,627,900 | B1* | 12/2009 | Noel et al. | 726/25 |
| 7,673,043 | B2* | 3/2010 | Keir et al. | 709/224 |
| 7,757,293 | B2* | 7/2010 | Caceres et al. | 726/25 |
| 7,890,869 | B1* | 2/2011 | Mayer et al. | 715/736 |

(Continued)

*Primary Examiner* — Carolyn B Kosowski
(74) *Attorney, Agent, or Firm* — Peter A. Nieves; Sheehan Phinney Bass + Green PA

(57) ABSTRACT

A system and method for extending automated penetration testing of a target network is provided. The method comprises: computing a scenario, comprises the steps of: translating a workspace having at least one target computer in the target network, to a planning definition language, translating penetration modules available in a penetration testing framework to a planning definition language, and defining a goal in the target network and translating the goal into a planning definition language; building a knowledge database with information regarding the target network, properties of hosts in the network, parameters and running history of modules in the penetration testing framework; and running an attack plan solver module, comprising: running an attack planner using the scenario as input, to produce at least one attack plan that achieves the goal, and executing actions defined in the at least one attack plan against the target network from the penetration testing framework.

15 Claims, 13 Drawing Sheets

U.S. PATENT DOCUMENTS

| | | | |
|---|---|---|---|
| 7,904,962 B1 * | 3/2011 | Jajodia et al. | 726/25 |
| 7,921,459 B2 * | 4/2011 | Houston et al. | 726/22 |
| 7,971,244 B1 * | 6/2011 | Kajekar et al. | 726/22 |
| 2001/0034847 A1 * | 10/2001 | Gaul, Jr. | 713/201 |
| 2003/0014669 A1 * | 1/2003 | Caceres et al. | 713/201 |
| 2003/0177376 A1 * | 9/2003 | Arce Velleggia et al. | 713/189 |
| 2003/0220940 A1 * | 11/2003 | Futoransky et al. | 707/104.1 |
| 2004/0128667 A1 * | 7/2004 | Caceres et al. | 717/174 |
| 2007/0180522 A1 * | 8/2007 | Bagnall | 726/22 |
| 2007/0204347 A1 * | 8/2007 | Caceres et al. | 726/25 |
| 2008/0028065 A1 * | 1/2008 | Caso et al. | 709/224 |
| 2008/0235691 A1 | 9/2008 | Anderson et al. | |
| 2008/0256638 A1 * | 10/2008 | Russ et al. | 726/25 |
| 2008/0263671 A1 * | 10/2008 | Solino Testa et al. | 726/25 |
| 2009/0007270 A1 | 1/2009 | Futoransky et al. | |
| 2011/0035803 A1 * | 2/2011 | Lucangeli Obes et al. | 726/25 |
| 2011/0061104 A1 * | 3/2011 | Sarraute Yamada et al. | 726/23 |

\* cited by examiner

SYSTEM AND METHOD FOR EXTENDING AUTOMATED PENETRATION TESTING TO DEVELOP AN INTELLIGENT AND COST EFFICIENT SECURITY STRATEGY

CROSS-REFERENCE TO RELATED APPLICATION

This application claims priority to copending U.S. Provisional Application entitled, "SYSTEM AND METHOD FOR EXTENDING AUTOMATED PENETRATION TESTING TO DEVELOP AN INTELLIGENT AND COST EFFICIENT SECURITY STRATEGY FOR ENTERPRISE-SCALE INFORMATION SYSTEMS," having Ser. No. 61/231,669, filed Aug. 5, 2009. In addition, this application claims priority to copending U.S. Provisional Application entitled, "Attack Planning in the Real World," having Ser. No. 61/362,511, filed Jul. 8, 2010. Each of these provisional applications are entirely incorporated herein by reference.

FIELD OF THE INVENTION

The present invention is generally related to computer and network security, and more particularly is related to developing a cost-efficient and scalable computer attack planner, which can automatically plan and build attack plans, and execute them in conjunction with a penetration testing framework.

BACKGROUND OF THE INVENTION

A penetration test is a set of risk assessment methodologies where the "penetration testers" or auditors assume the place of an attacker in order to examine the security controls in place of an infrastructure of networked computers and applications. Typically, the penetration tester will mimic a specific profile of an attacker, which can be a disgruntled employee in a given area of an organization, an external "script kiddie," or a corporate spy. The result of the penetration test is generally a report that includes the list of threats that this profile of an attacker could exercise. For example, a disgruntled employee in accounting may be able to steal the clients and credit card database, a corporate spy may be able to access secret Intellectual Property, and a "script kiddie" may compromise and leave unavailable the machines for all the cashiers of a retailer business.

The last ten (10) years have witnessed the development of a new kind of information security tool: the Penetration Testing Framework. These tools facilitate the work of penetration testers on networked computers and applications, and make the security assessment more accessible to non-experts. The main difference between these tools and network security scanners is that Penetration Testing Frameworks have the ability to exploit vulnerabilities, and help to expose risk by assessing the complete attack path an attacker would take, whereas scanners simply look for evidence of vulnerablities.

Penetration tests involve successive phases of information gathering, where the penetration testing framework helps the user to gather information about the networked computers and applications under attack (available hosts, their operating systems, open ports, and the services running in them). Penetration tests also involve exploiting, where the user actively tries to leverage vulnerabilities present on specific assets in the network and gain unwarranted access to these. When this leverage is through an exploit launched against a vulnerable machine and this exploit is successful, the machine becomes compromised and can be used to perform further information gathering, or the machine can be used to launch subsequent attacks. This shift in the source of the actions of an attacker is called pivoting. Other forms of leveraging vulnerabilities include, but are not limited to, exploitation of application vulnerabilities and gaining non-authorized access to Wi-Fi communication channels or other types of assets.

Newly compromised machines or applications can serve as the source for posterior information gathering. This new information might reveal previously unknown vulnerabilities. As a result, the phases of information gathering and exploiting usually succeed one another.

As penetration testing frameworks have evolved they have become more complex, covering new attack vectors, shipping increasing numbers of exploits and information gathering modules. With this growth, the problem of successfully controlling the Penetration Testing Framework has become a complex task for all of its users.

Computer attacks are the object of study of computer scientists and computer security professionals. In particular, the threats or potential attacks underlying a target network can be described through attack graphs, which are modeling tools used for these studies. In particular, attack graphs can be used to model an attack before executing it, or during its execution in order to analyze future next steps.

There are many ways to model an attack through attack graphs. To define one such model, one needs to define "nodes" and "edges". In one possible way to model attack graphs, nodes identify a state of the attack, while edges represent individual actions in the attack. Generally speaking, the state is defined by the knowledge that the attacker has gained so far about the network—from the start of the attack until the action (edge) preceding this node. An action comprises an action done by the attacker; an action could be using a penetration testing module to gain information regarding a given asset or compromise an asset. In attack graphs, an attack path is a sequence of actions, where the preconditions for an action are always guaranteed by the previous actions and the last action conquers the goal.

Most studies in attack graphs require having the complete attack graph in memory for its studying. Unfortunately, most, if not all, attack graph models make it impossible to do this, since one can only hold in storage attack graphs on small networks, as an example, with fewer than twenty (20) hosts. In medium-sized networks, building complete attack graphs quickly becomes unfeasible since the size of the attack graph (and then of the memory required to store this graph) increases exponentially with the number of machines and available actions.

Thus, a heretofore unaddressed need exists in the industry to address the aforementioned deficiencies and inadequacies.

SUMMARY OF THE INVENTION

Embodiments of the present invention provide a system and method for extending automated penetration testing of a target network. In this regard, one embodiment of such a method, among others, can be broadly summarized by the following steps: computing a scenario, wherein the step of computing the scenario comprises the steps of: translating a workspace having at least one target computer in the target network, to a planning definition language, translating penetration modules available in a penetration testing framework to a planning definition language, and defining a goal in the target network and translating the goal into a planning definition language; building a knowledge database with information regarding the target network, properties of hosts in the network, parameters and running history of modules in the penetration testing framework; and running an attack plan solver module, wherein the attack plan solver module performs the steps of: running an attack planner using the scenario as input, to produce at least one attack plan that achieves the goal, and executing actions defined in the at least one attack plan against the target network from the penetration testing framework.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
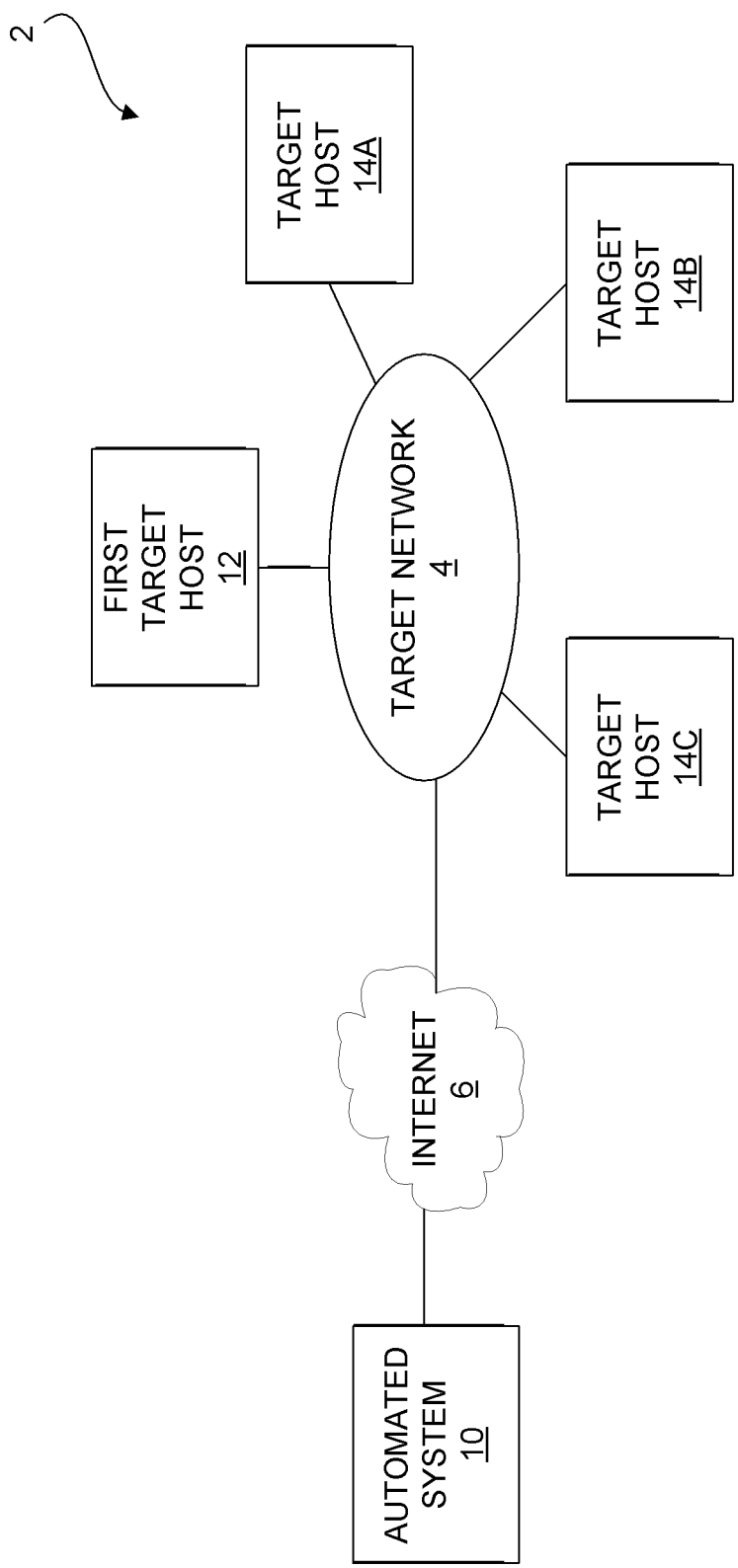
FIG. 1 is a schematic diagram illustrating a network in which the present automated system may be provided.

The present system and method provides an automated process for planning and performing a penetration test to assess security within a network of computers, devices and applications. A computer-generated plan is provided for an attack, which isolates the user from the complexity of selecting suitable exploits for hosts in a target network. In addition, a suitable model is provided to represent these attacks so as to systematize the knowledge gained during manual penetration tests performed by expert users, thereby making penetration testing frameworks more accessible to non-experts. Further, incorporating an attack planning phase to the penetration testing framework allows, in accordance with the present invention, optimizations based on, but not limited to, coverage of the tested threats, exploit running time, reliability, or evasion of intrusion detection systems, and other control or defense systems. As is known by those having ordinary skill in the art, intrusion detection systems are devices or applications that inspect network traffic, looking for attacks and generating alerts when attacks are detected. Detection is done by inspecting packet streams looking for "static signatures of attacks," or statistical deviations from good behavior, or variations of previously-identified malicious behavior.

The present system and method uses a conceptual model of an attack distinguishing assets, actions, and goals. The assets represent both the information and the modifications in the network that an attacker may need to obtain during an attack, whereas the actions are the basic steps of an attack, such as running a particular exploit or information gathering module against a target asset. The present system and method was designed to be realistic from the point of view of an attacker, and contemplates the fact that the attacker has an initial incomplete knowledge of the network, and therefore information gathering should be considered as part of the attack. Alternatively, most of the attack planning literature uses another module where the graph is produced with complete information of the network and its assets; and the attack graph then includes all the possible exploitation actions of the attacker. The goal of a penetration test may be defined by an automated or manual process as a specific asset or set of assets. For example, the goal can be any of those described in the first paragraph of the background of the invention.

An action may have requirements or preconditions that are defined as certain assets. For example, in order to compute the operating system of a host, one needs (the asset) network connectivity to this host. After executing an action, a new asset may be gained: that is, new information is learned or a change in the target network has happened. Since the actions have requirements and results, given a goal, a set of attack graphs of the actions/assets that start from the available assets and lead to this goal can be constructed. The attack planning problem entails automatically finding sequences of actions that lead from a starting state of the attack, with incomplete knowledge of the network, ending in the final goal.

Using the terminology of attack graphs, the solution of the attack planning problem is that of finding at least one attack path that leads to the goal (i.e., the state of the attack defined by this node should include the goal). Moreover, since the attack planning problem has typically more than one solution, one may look for a specific solution, for example, the path that underlies less expected time of execution or has less expectancy to be detected by control systems. To deal with the attack planning problem, the present system and method, in accordance with one embodiment of the invention, translates the conceptual model of an attack into a Planning Domain Definition Language (PDDL) representation and uses classical planning algorithms to find attack paths. It should be noted that the present invention is not limited to translating the conceptual model of an attack into a PDDL representation, this representation being widely adopted in automated planning problems. Alternatively, any planning language may be used.

Planning algorithms manage to find paths in the attack graph without constructing the graph completely, thus helping to avoid the combinatorial explosion. As is known by those having ordinary skill in the art, combinatorial explosion is about the complexity associated with time and memory necessary to test all the possible combinations of attacks available in the entire network. In testing all possible combinations of attacks one has to consider all the hosts, operating systems, applications running, open ports, vulnerabilities, attacks available, etc. The computer-theoretic size of the problem is intractable unless handled with a heuristic solution.

FIG. 1 is a schematic diagram illustrating a network 2 in which the present automated system 10 may be provided to automatically identify, analyze, exploit, and document security vulnerabilities in a target network 4. Automated penetration testing is executed by the automated system 10, which may be, for example, a personal computer or other device as described below. The automated system 10 may connect to the target network 4 via, for example, the Internet 6. In the case of such example, the automated system 10 would be connected to the Internet 6 and would gain access to the target network 4 via the Internet 6.

The target network 4 has a first target host 12, which may be any target asset within a network. Examples of target assets may be, but are not limited to, firewalls, hosts, servers, mobile devices, or any other target asset within a network. The target network 4 has a number of other target hosts 14A-14C connected to it, each of which could be the eventual targets of the penetration test.

Figure 2:
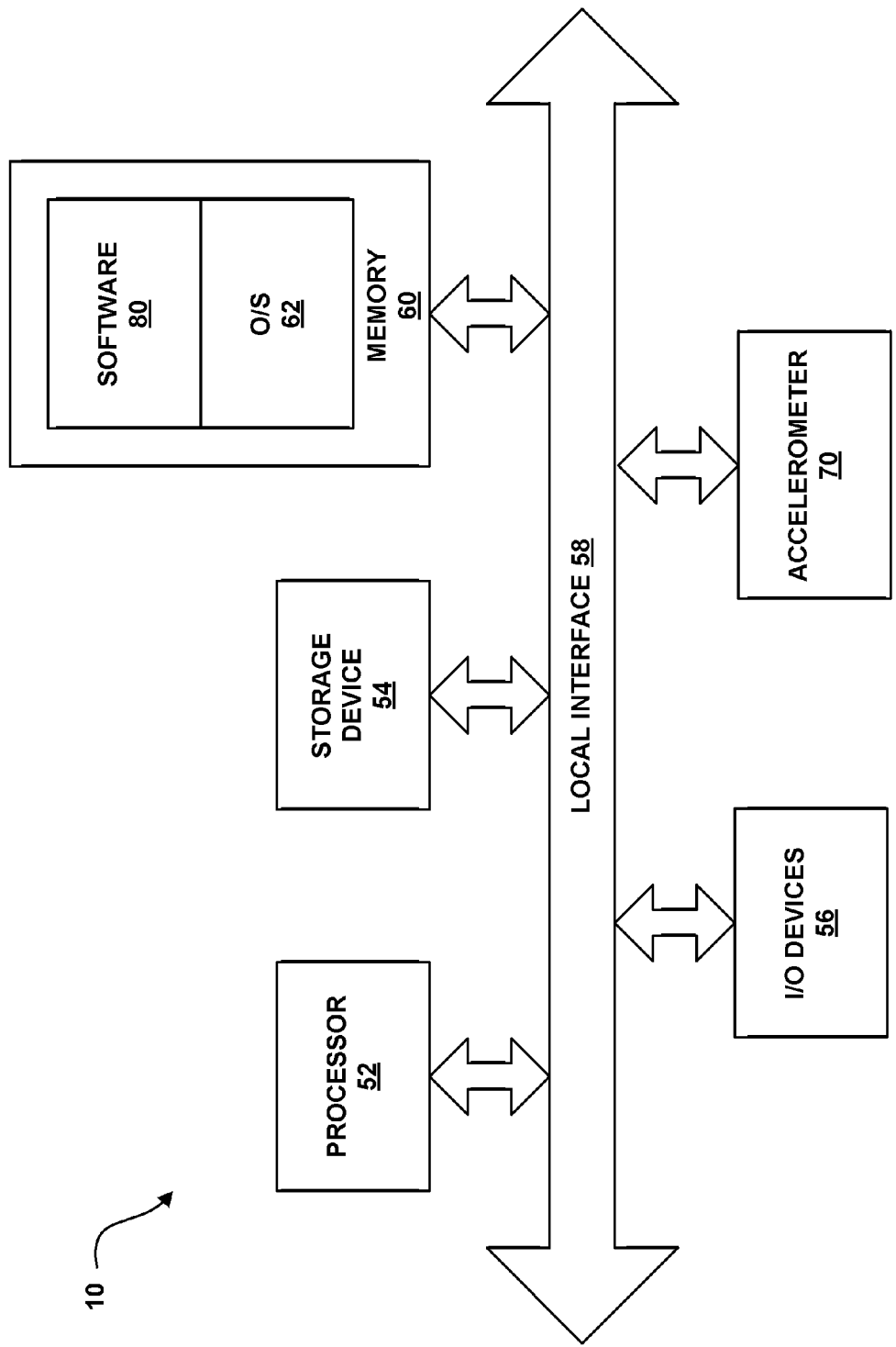
FIG. 2 is a schematic diagram illustrating a general-purpose computer architecture that can implement the automated system.

Functionality of the present automated system 10 and method can be implemented in software, firmware, hardware, or a combination thereof. In a first exemplary embodiment, a portion of the automated system 10 is implemented in software, as an executable program, and is executed by a special or general-purpose digital computer, such as a personal computer, workstation, minicomputer, or mainframe computer. The first exemplary embodiment of a general-purpose computer architecture that can implement the automated system 10 is shown in FIG. 2. Since the computer is executing functionality of the automated system 10, the computer is also identified by the number 10.

Generally, in terms of hardware architecture, as shown in FIG. 2, the computer 10 includes a processor 52, memory 60, storage device 54, and one or more input and/or output (I/O) devices 56, or peripherals, that are communicatively coupled via a local interface 58. The local interface 58 can be, for example but not limited to, one or more buses or other wired or wireless connections, as is known in the art. The local interface 58 may have additional elements, which are omitted for simplicity, such as controllers, buffers (caches), drivers, repeaters, and receivers, to enable communications. Further, the local interface 58 may include address, control, and/or data connections to enable appropriate communications among the aforementioned components.

The processor 52 is a hardware device for executing software, particularly that stored in the memory 60. The processor 52 can be any custom made or commercially available processor, a central processing unit (CPU), an auxiliary processor among several processors associated with the computer 10, a semiconductor based microprocessor (in the form of a microchip or chip set), a macroprocessor, or generally any device for executing software instructions.

The memory 60 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 60 may incorporate electronic, magnetic, optical, and/or other types of storage media. Note that the memory 60 can have a distributed architecture, where various components are situated remote from one another, but can be accessed by the processor 52.

The software 80 in the memory 60 may include one or more separate programs, or modules, each of which contains an ordered listing of executable instructions for implementing logical functions of the automated system 10, as described below. In the example of FIG. 2, the software 80 in the memory 60 defines the automated system 10 functionality in accordance with the present invention. In addition, although not required, it is possible for the memory 60 to contain an operating system (O/S) 62. The operating system 62 essentially controls the execution of computer programs and provides scheduling, input-output control, file and data management, memory management, and communication control and related services.

The automated system 10 may be provided by a source program, executable program (object code), script, or any other entity containing a set of instructions to be performed. When a source program, then the program needs to be translated via a compiler, assembler, interpreter, or the like, which may or may not be included within the memory 60, so as to operate properly in connection with the O/S 62. Furthermore, the automated system 10 can be written as (a) an object oriented programming language, which has classes of data and methods, or (b) a procedure programming language, which has routines, subroutines, and/or functions.

The I/O devices 56 may include input devices, for example but not limited to, a keyboard, touch screen, mouse, scanner, microphone, joystick or other input device. Furthermore, the I/O devices 56 may also include output devices, for example but not limited to, a display, or other output device. The I/O devices 56 may further include devices that communicate via both inputs and outputs, for instance but not limited to, a modulator/demodulator (modem; for accessing another device, system, or network), a radio frequency (RF) or other transceiver, a telephonic interface, a bridge, a router, or other device that functions both as an input and as an output.

When the automated system 10 is in operation, the processor 52 is configured to execute the software 80 stored within the memory 60, to communicate data to and from the memory 60, and to generally control operations of the computer 10 pursuant to the software 80. The software 80 and the O/S 62, in whole or in part, but typically the latter, are read by the processor 52, perhaps buffered within the processor 52, and then executed.

When the automated system 10 is implemented in software, as is shown in FIG. 2, it should be noted that the automated system 10 can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The automated system 10 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The storage device 54 may be a computer readable medium that is removable, stationary, or stationary with a removable computer readable medium located therein. The storage device 54 may be an electronic, magnetic, optical, or other physical device or arrangement that can contain or store any data and/or program, for use by or in connection with the computer 10 of the present system. Specifically, as is described in detail below, the storage device 54 has multiple databases located therein for use by the automated system 10, as is described in detail below. In addition, the storage device can be permanently located within the automated system 10 or removably connected thereto.

In an alternative embodiment, where the automated system 10 is implemented in hardware, the automated system 10 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), or other technologies.

Figure 3:
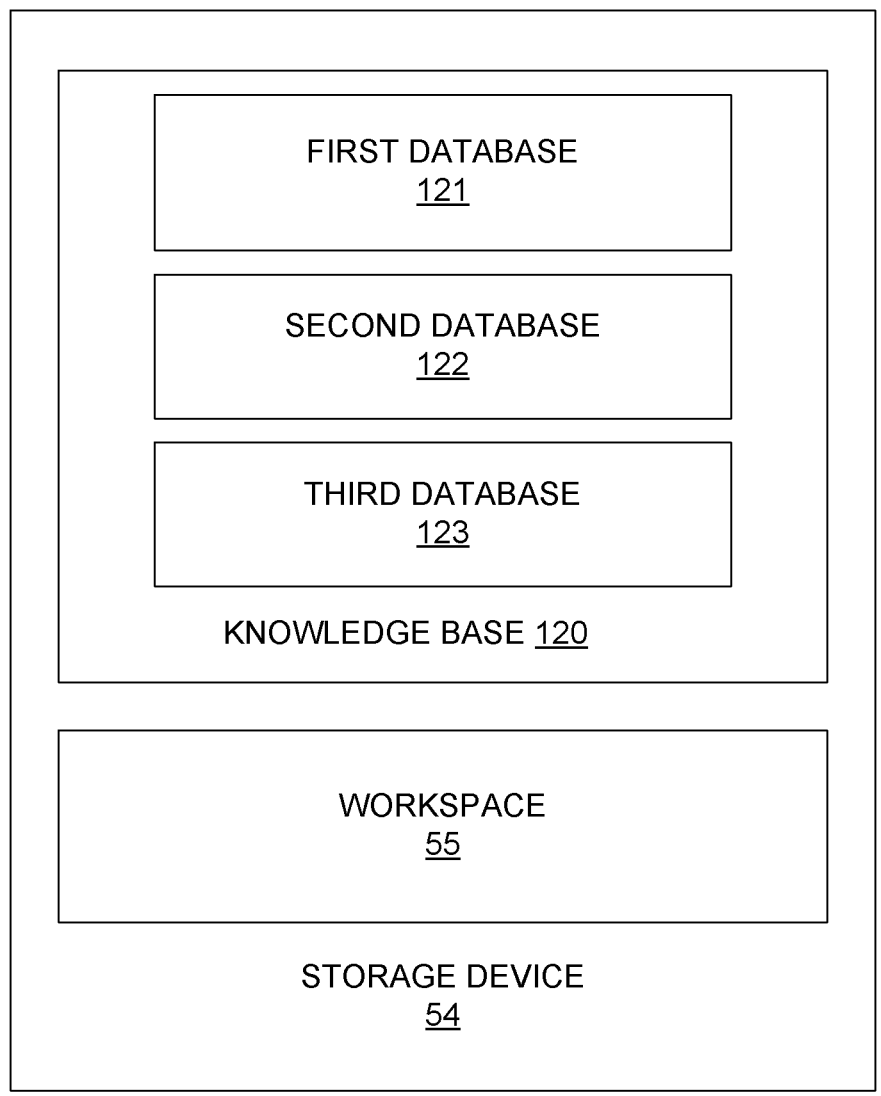
FIG. 3 is a schematic diagram further illustrating the storage device of FIG. 2.

As shown by FIG. 3, the storage device 54 at least has stored therein a workspace 55 and a knowledge base 120, where the knowledge base is composed of different databases. It should be noted that the workspace 55 and knowledge base 120 may instead be located in a separate location remote from the automated system 10. The workspace 55 maintains a representation of the knowledge of the target network available to perform attacks against, including but not limited to computers, connections between computers, open/closed ports, operating systems and services running on the computers.

A first database 121 within the knowledge base 120 stores information regarding the network being tested and the ongoing penetration test. This information can be extracted from the workspace 55 and includes the hosts discovered and information about each host, including, but not limited to, open/closed ports, agents installed and operating systems. The database also contains information regarding which penetration testing modules 102 and tests were executed in the current penetration test, such as, for example, module version and outcome, among other history data.

A second database 122 within the knowledge base 120 contains information regarding the modules located within a penetration testing framework module (100, FIG. 5), such as the requirements for each module and its performance statistics, including, but not limited to, the running time and success rate of the module for different types of assets. As a non-limiting example, such information may include the running time against each combination of operating system, version, and patch level.

A third database 123 within the knowledge base 120 stores information regarding target networks in general along with statistical estimations regarding the distribution of operating system installations depending on the machine type, vulnerabilities, network topologies, and other statistics. An example of such information may be, but is not limited to, for the history of the penetration tests, performed in the attack plan solver mentioned below (or other instances of the attack plan solver whose knowledge bases are shared and combined by their vendor), the percentage of Web servers with operating system X.

Figure 4:
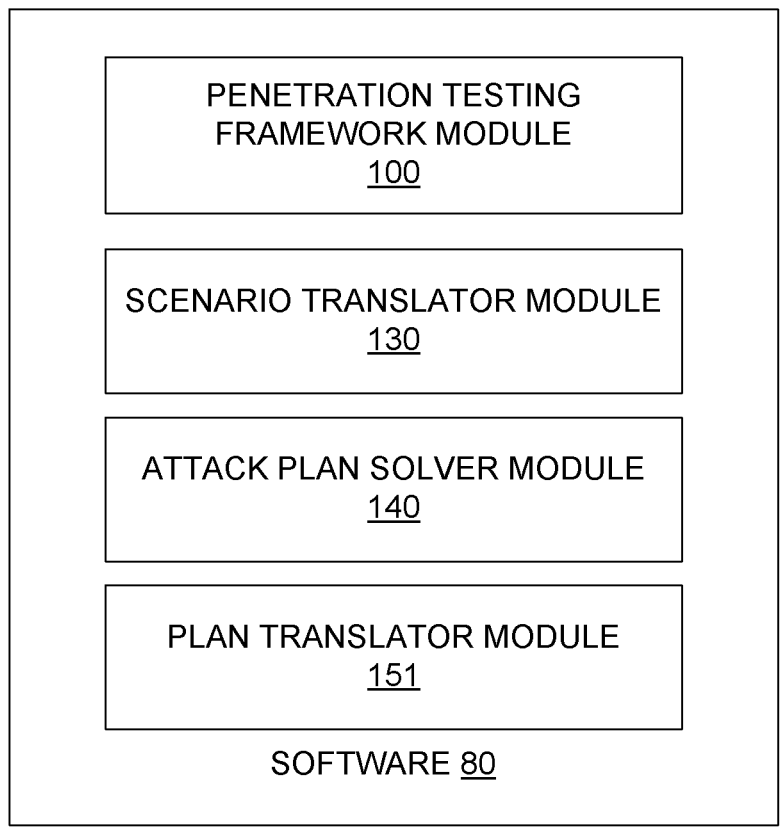
FIG. 4 is a schematic diagram further illustrating modules of the software of FIG. 2.

FIG. 4 is a schematic diagram further illustrating modules of the software 80 of FIG. 2. As shown by FIG. 4, the software contains a penetration testing framework module 100, a scenario translator module 130, an attack plan solver module 140, and a plan translator module 151. Each of these modules 100, 130, 140, 151 is described in detail hereinafter.

Figure 5:
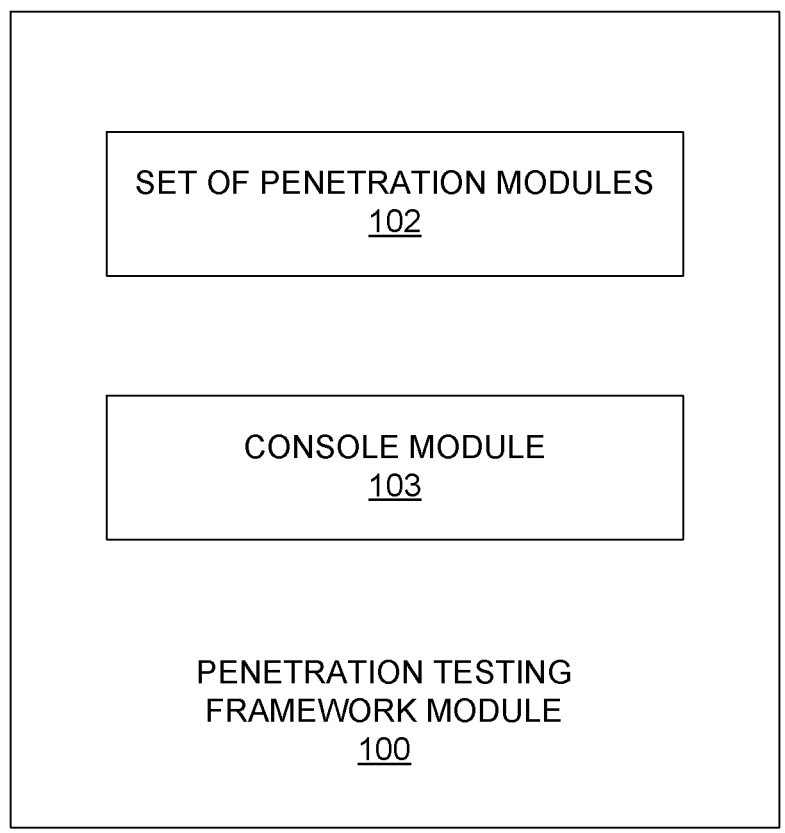
FIG. 5 is a schematic diagram further illustrating the penetration testing framework module of FIG. 4.

FIG. 5 is a schematic diagram further illustrating the penetration testing framework module 100 of FIG. 4. As shown by FIG. 5, the penetration testing framework module 100 is further composed of a console module 103 and a set of penetration testing modules 102 that can be run against a target network.

The console module 103 provides instructions for the execution of modules either by local or remote agents. Herein, a local agent is defined within the console module 103. Modules that run against remote computers, or target hosts, can install remote agents, which can then be used to execute other modules in a remote fashion. A further description of local and remote agents is provided by U.S. Pat. No. 7,757,293, entitled, "Automated Computer System Security Compromise," by Caceres et al., filed on Jan. 22, 2002, the disclosure of which is hereby incorporated by reference in its entirety.

The set of penetration testing modules 102 is composed of different kinds of modules, which include information gathering modules, attack and penetration modules, post-exploitation modules and other miscellaneous modules that may be used to run attacks against the network.

Figure 6:
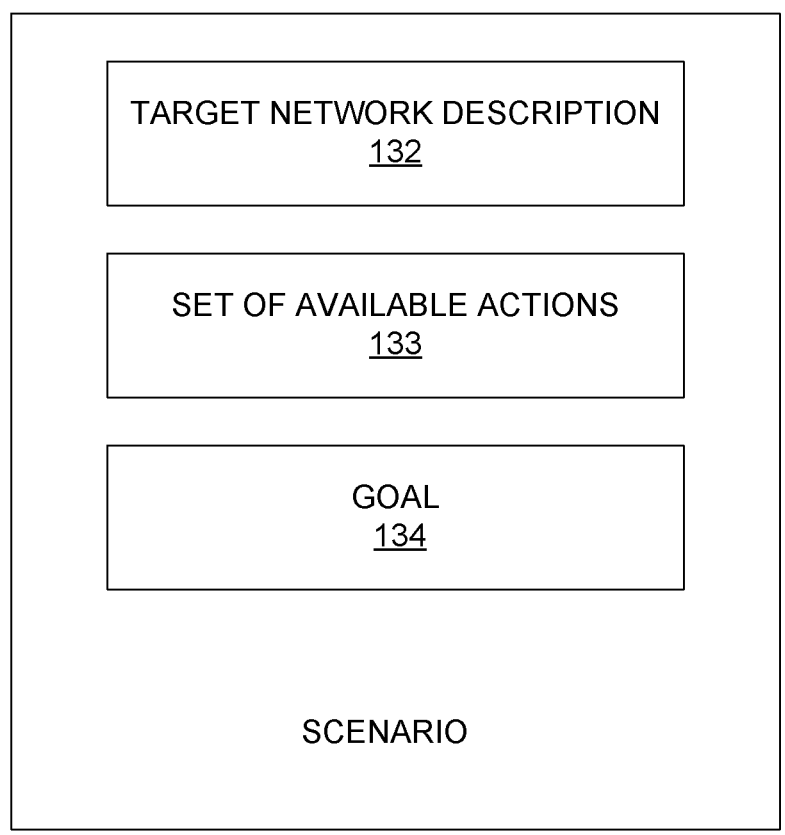
FIG. 6 is a schematic diagram further illustrating portions of a scenario.
Figure 7:
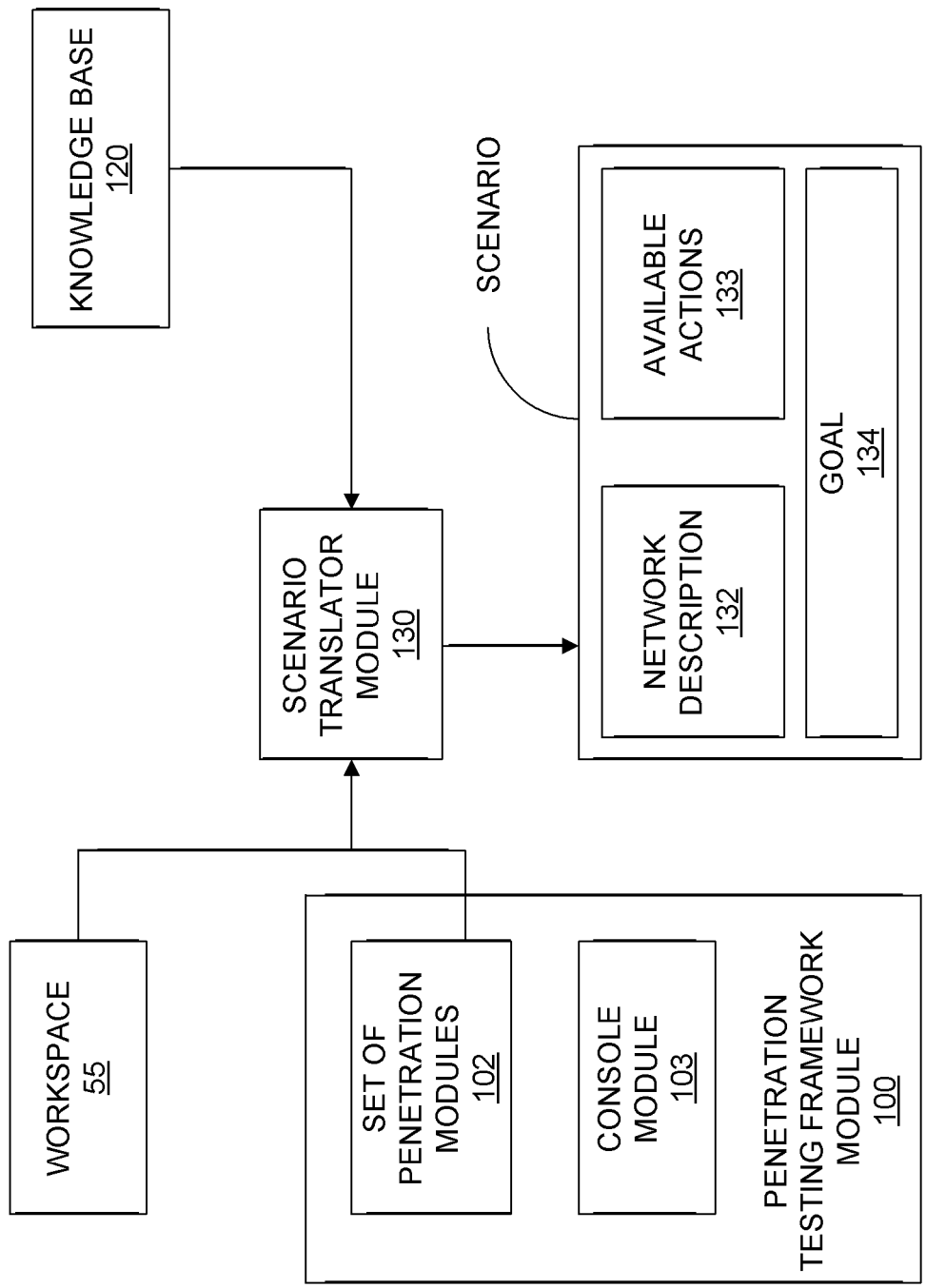
FIG. 7 is a schematic diagram demonstrating interaction between the scenario translator module and other portions of the automated system.

FIG. 6 is a schematic diagram further illustrating a scenario, which is produced by the scenario translator module. In addition, FIG. 7 is a schematic diagram demonstrating interaction between the scenario translator module 130 and other portions of the automated system 10. The following refers to both FIG. 6 and FIG. 7. Specifically, the scenario translator module 130 uses as input, the knowledge base 120 and workspace 55, and the set of penetration testing modules 102, and produces a scenario.

The scenario contains a target network description 132, which is a translation of the workspace 55, and a list of available actions 133, which corresponds to the set of penetration testing modules 102. In addition, the scenario contains a goal 134, as described herein. It should be noted that the scenario may be stored in the storage device 54 or in a remote location.

The network description 132 contains information regarding the details of the target network, including but not limited to, the connections between target hosts in the target network, the software each target host is running, operating systems, services available and open/closed ports of the target hosts.

The goal 134 of the scenario may be one asset or a set of assets, for example, "having a remote agent running in a target host having the IP address 192.168.1.100." The goal 134 is the objective inside the scenario and describes what must be achieved through the execution of a sequence of the penetration testing framework modules 100. One possible way to implement the scenario is to represent it using the PDDL language.

One possible set up for the scenario translator module 130 is to take the workspace 55, the set of penetration modules 102, and a manually-defined goal or one defined by an external automatic process that is not part of this invention, along with the information in the knowledge base 120, and build the scenario (that is, a PDDL representation of the workspace, list of penetration modules, goal and knowledge base). The scenario will contain the following PDDL objects: types, predicates, fluents and actions. An example of a possible translation to PDDL follows. It should be noted that this is only one possible set-up for the scenario translator module 130, and one having ordinary skill in the art would appreciate that PDDL is only one choice of a planning definition language, and that other planning languages may be supplemented.

Types describe the class of objects present in the scenario. The types in table 1 compose a possible set of types.

TABLE 1

A set of types

| Type | Represents |
| --- | --- |
| Host | A host in the workspace |
| Port | A port in a host. |
| port_set | A set of Ports |
| application | An application. It can be installed in different hosts. |
| network | A set of connected hosts. |
| Agent | A network (reomote or local) agent, capable of executing commands. Agents can be installed in compromised hosts. |
| operating_system | An operating system running in a host. E.g.: Windows, Linux, OpenBSD, Solaris, etc. |
| os_version | The operating system version. E.g.: XP, Vista, 2000, etc. |
| os_edition | The operating system edition. E.g.: Server, Advanced Server, etc. |
| os_build | The operating system build number. |
| os_servicepack | The operating system service pack. |
| os_distro | Where available, the distribution name. E.g.: Ubuntu, Debian, Fedora, etc. |
| kernel_version | The installed kernel version. |

PDDL predicates represent yes or no questions for missing information or actions yet-to-be-done. Formally speaking, PDDL predicates are parameterized statements that can take true/false values and are used to express unknown values for objects with defined types inside the scenario such as the ones described in table 1. The PDDL predicates are useful to define the details about target hosts, such as their connectivity inside the target network and their unique properties. PDDL predicates include, but are not limited to, questions whether the requirements for a penetration module are satisfied or not. For example, the PDDL predicate (TCP_connectivity ?s-host?t-host?p—port) is true if and only if host s has TCP connectivity to host t on port p. In the example, ?s ?t and ?p are parameters representing the source host, the target host and a port respectively; the types of these parameters are host, host, port respectively. This is how the knowledge described in the workspace is translated into PDDL.

PDDL actions are the building blocks for the plans that are to be executed by the penetration testing framework module 100. The parts of an action are: parameters, requirements and effects. Each action has a set of preconditions (requirements) that must be satisfied in order to run the action (e.g., the penetration module). These preconditions must be defined using PDDL predicates and logical connectors (i.e., AND, OR).

The parameters are defined by their type and the value of the parameter must be provided as input. An action has an effect, which generally speaking is the outcome of this action, sometimes expressed as predicates or recomputing the value of global plan variables (including but not limited to run_time, stealth_level or uncertainty), also called effects. Global plan variables are variables used by the planner.

Effects represent the outcome of an action; they are either numerical effects (fluent) or PDDL predicates. PDDL predicates have been described before. PDDL fluents or numerical effects are quantifiable values that are modified by the execution of each action, such as run time, stealth, or other actions, that can be expressed throughout a plan building process performed by the attack plan solver module 140.

Some planners accept numerical effects but others do not. The planners that accept numerical effects can build plans constrained to a given metric optimization. An example of these planners is Metric-FF. It should be noted that possible effects could be, but are not limited to, different predicate assertions or increasing some numerical variable (metric) such as running_time.

There are actions that are specific to the network knowledge and are required in order to make some predicates true. For example: TCP_connect is an action with preconditions over two hosts, s and t, that can be expressed as follows: "connect s and t through TCP if s is compromised (or controlled), s has IP_connectivity to host t has port p open". The effect of this action is that if the described conditions are met, then the predicate that ensures that host s has TCP_connectivity to host t through port p becomes true. The PDDL predicate TCP_connect follows:

```
(:actionTCP_connect
    :parameters (?s - host ?t - host ?p - port)
    :precondition (and
        (compromised ?s)
        (IP_connectivity ?s ?t)
        (TCP_listen_port ?t ?p))
    :effect (TCP_connectivity ?s ?t ?p)
)
```

Another set of actions is the set composed by the translation of the penetration modules 102. These actions could be for example exploits available to be run over a target host.

Figure 8:
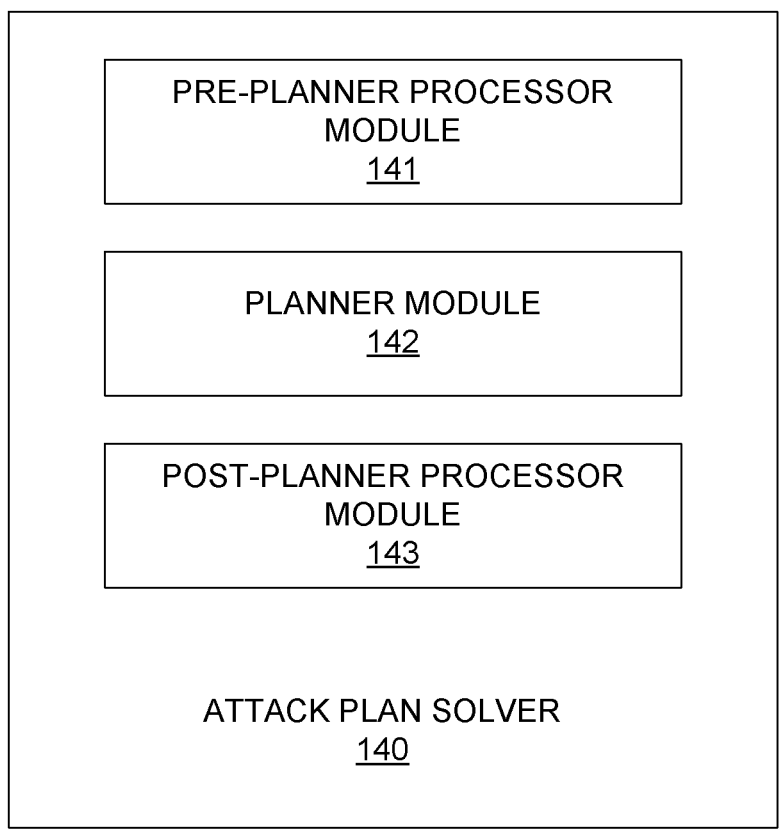
FIG. 8 is a schematic diagram further illustrating the attack plan solver module of FIG. 4.
Figure 9:
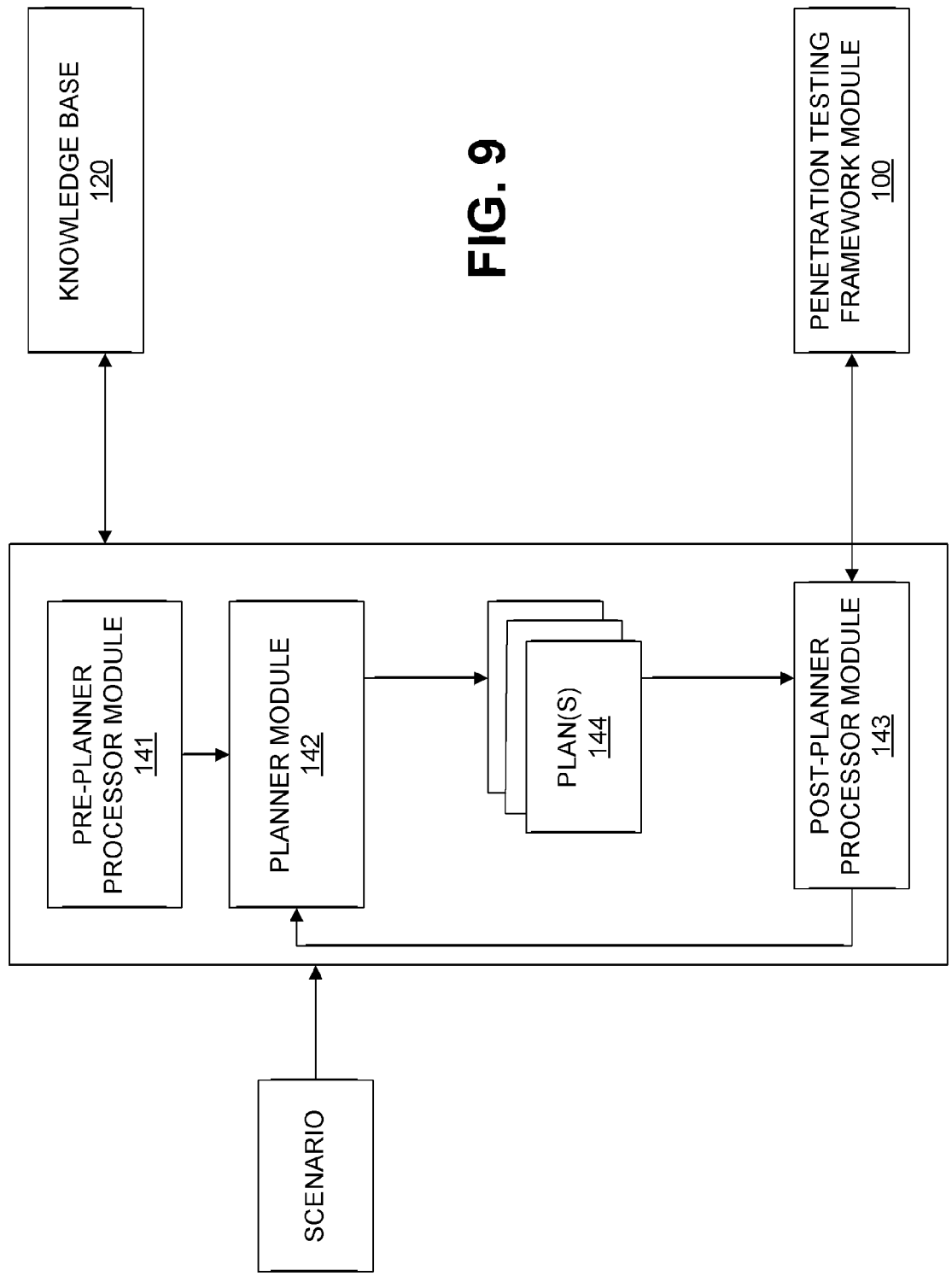
FIG. 9 is a schematic diagram demonstrating interaction between the attack plan solver module and other portions of the automated system.

FIG. 8 is a schematic diagram further illustrating the attack plan solver module 140 of FIG. 4. In addition, FIG. 9 is a schematic diagram demonstrating interaction between the attack plan solver module 140 and other portions of the automated system 10. The following refers to both FIG. 8 and FIG. 9.

The attack plan solver (APS) 140 is composed of a pre-planner processor module 141, a planner module 142, and a post-planner processor module 143. The pre-planner processor module 141 uses the information available in the knowledge base 120 and PDDL scenario to modify the PDDL scenario. The objective of the pre-planner processor module 141 is to enhance the efficiency of the execution, or run, of the planner module 142 underlying this scenario (explicitly, to minimize the running time of the planner against an alternative representation of the PDDL scenario with equivalent solutions). The pre-planner processor module 141 can, for example, reduce the complexity of building a plan by removing unnecessary constraints or definitions. The pre-processor module 141 also updates the knowledge base 120 with strategic information about the target networked computers and applications, including, but not limited to, OS installation statistics and versions.

Scenario optimizations can be done over assets of the network (nodes in the attack graph) or actions available (edges in the attack graph). The following provides three examples of possible optimizations that can be performed over the scenario in order to reduce the complexity of the plan-building task.

Example 1

Consider a scenario where all target hosts have the same operating system family: all some version of Windows. Then the pre-planner processor 141 could remove all non-Windows actions from the scenario, since they can never be executed against a Windows host.

Example 2

In the same scenario there could be actions that attack the same application or service, grouping these actions into one generic one. For example, grouping the actions "Apache Chunked encoding exploit", "Apache mod_php exploit", "Apache mod rewrite remote buffer overflow exploit" and "Apache OpenSSL ASN deallocation exploit" into one generic "Apache" action would reduce the number of actions available in each plan-building step. Some specific information about each action must be taken into account while doing an optimization like the one described, the preconditions must be combined so any of the grouped actions can be used to fulfill the objective. Moreover, each grouped action might have different outcomes (e.g., agents with different privileges), and this must also be taken into account.

Example 3

Collapsing similar machines into one "meta-machine" reduces the amount of assets present in the scenario. The grouping can be made based on similarities between the assets such as, but not limited to, same operating system, open ports, and connectivity type from a given point in the scenario. Thus, only the "meta-machine" must be taken into account for plan building.

The planner module 142 receives as input a PDDL scenario, and calculates one or more possible plans 144 that if executed, lead to the defined goal 134. The possible plans 144 calculated can be simple straight-forward paths or part of a tree-like structure with some decision points, dependent on the execution of some actions.

The planner module 142 can be instantiated with different generic proactive planner types, which given the scenario calculate the plans, such as the fast-forward planning system (FF), Metric-FF, the Sgplan, or with a custom-built planner. In addition, reactive planners that can observe and react to changes in the scenario can be used.

The post-planner processor module 143 is in charge of performing optimizations and executing the plans 144 calculated by the planner module 142 inside the penetration testing framework 100 and monitoring the execution and outcome of each step of the plans 144.

If the planner module 142 is a proactive planner with several alternative plans 144, the post-planner processor module 143 can execute the alternative plans 144 in parallel in order to choose the best alternative based on different properties, including, but not limited to, run time, stealth level, or uncertainty. If only one plan 144 is calculated, the post-planner processor module 143 will execute steps sequentially in an ordered fashion, although it may select some actions to be executed in parallel if the preconditions are given.

If the planner module 142 is a reactive planner, the post-planner processor module 143 will execute the plan 144 in a single-step fashion, where after executing an action (step of the plan) the post-planner processor module 143 can recognize changes in the scenario and, after making the proper changes in the PDDL definition of the scenario, send the changed scenario back to the planner module 142 together with the original plan 144, to calculate a refined plan. The plans computed by reactive planners may also have actions that learn from the target network and updates the information in the scenario.

The post-planner processor 143 calls the penetration testing framework to execute the actions in the plan (through the plan translator 151), monitors their outcome and updates the knowledge base 120 with this result. In addition, the attack planner ensures that the preconditions between actions is preserved. Thus, when a step fails to produce the expected outcome, the post-planner processor module 143 can identify the failure and, for example, decide whether a re-plan is needed, and remove the failed action so that it cannot be chosen again by the planner module 142. (Else, when using some planners one would end in an infinite loop.)

Figure 10:
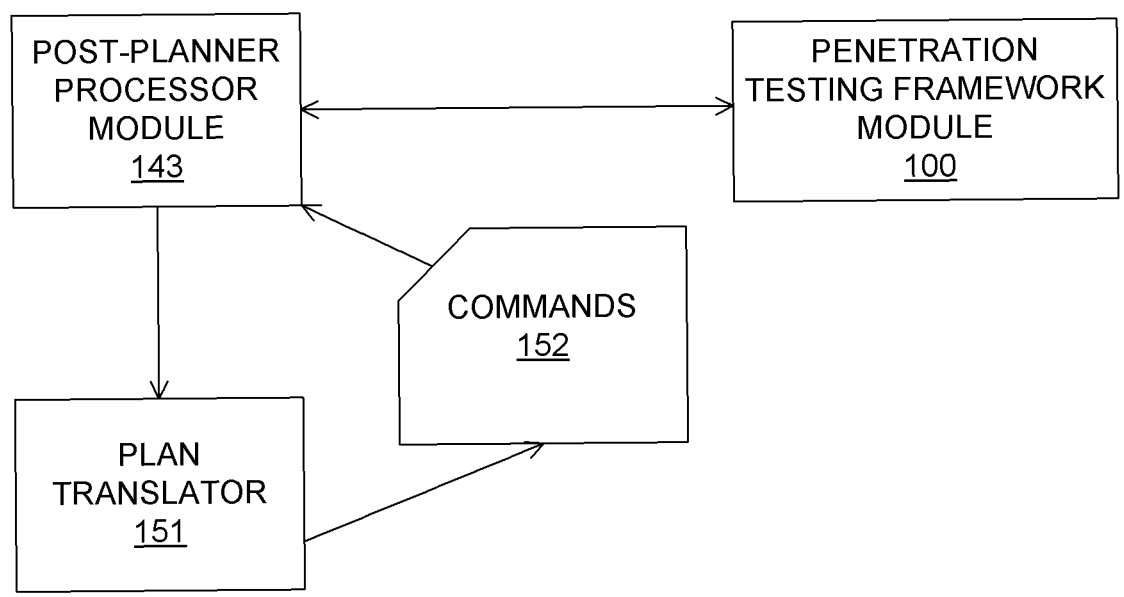
FIG. 10 is a schematic diagram demonstrating interaction between the plan translator module and other portions of the automated system.

FIG. 10 is a schematic diagram demonstrating interaction between the plan translator module 151 and other portions of the automated system 10. The plan translator module 151 is used by the post-planner processor module 143, which given a plan 144 generated by the planner module 142, translates the plan 144 into commands 152 that can be run by the penetration testing framework console module 103. Some of these command modules are modules that have to be run in order to achieve the objective defined in the scenario. The following provides examples of use of the plan translator module 151.

The pre-planner processor module 141 analyzes the PDDL scenario definition given by the plan translator module 151 and removes the actions that cannot be applied to any target host present in the PDDL scenario, due to non-present OS family. The pre-planner processor module 141 then updates the knowledge base 120 to reflect this information.

Example 1

Proactive Planner—Single Plan

The pre-planner processor module 141 sends the modified scenario to the planner module 142 and the planner module 142 computes a single plan, composed by a sequence of actions. The post-planner processor module 143 then calls the plan translator 151 and executes each step of the plan 144 using the penetration testing framework 100.

Example 2

Proactive Planner—Parallel Plans

The pre-planner processor module 141 sends the modified scenario to the planner module 142 and the planner module 142 computes different plans 144. The post-planner processor module 143 executes the different plans in parallel using the penetration testing framework, as described in the previous example, until the goal is reached by one of the plans.

Example 3

Reactive Planner

Assume the pre-planner processor module 141 modified the PDDL scenario received form the scenario translator 130 and sends it to the planner module 142. The planner module 142 then starts the computation of a plan 144 and forces the usage of actions that learn new information from the target network and monitors when new information is received by the workspace and updated in the PDDL scenario. Once the planner module 142 computes a first plan 144 it forwards the first plan 144 to the post-planner processor module 143, which starts the execution of each step of the plan 144 by calling the plan translator to translate the plan 144 into commands of the penetration testing framework 100. In turns, the workspace may be modified and so the scenario translator 130 will update the scenario with the changes.

The post-planner processor module 143 monitors the execution of each step and can perform actions based on changes observed in the scenario. The post-planner processor module 143 can force a re-plan action by sending the updated scenario and the original plan 144 to the planner module 142 so that the planner module 142 can calculate a new plan 144. This process can repeat itself to conform an iterative planning process.

Example 4

Reactive Planner

The same planner module 142 builds a tree-like plan. This tree is formed of attack paths that share arcs in common. In general, these attack paths will share the first arcs and then divide in two arcs when an action may have two possible outcomes. These divisions are produced when new information is learned from the target network. This leads to a conditional plan that can result in the execution of different plans depending on the scenario properties detected after running each action.

Figure 11:
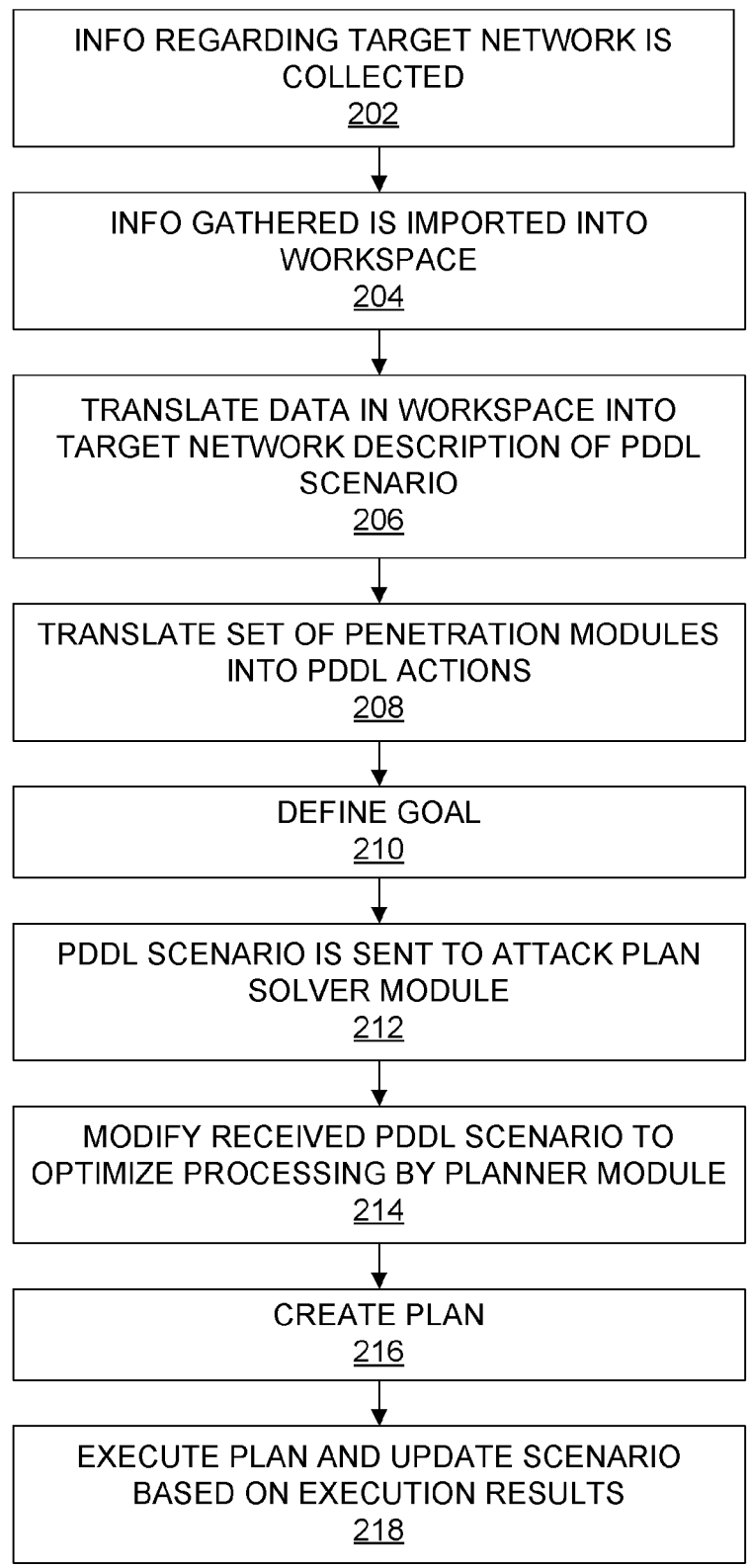
FIG. 11 is a flowchart illustrating the process of running an automated penetration test in accordance with one exemplary embodiment of the invention.

FIG. 11 is a flowchart 200 illustrating the process of running an automated penetration test in accordance with one exemplary embodiment of the invention. It should be noted that any process descriptions or blocks in flow charts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

Figure 12:
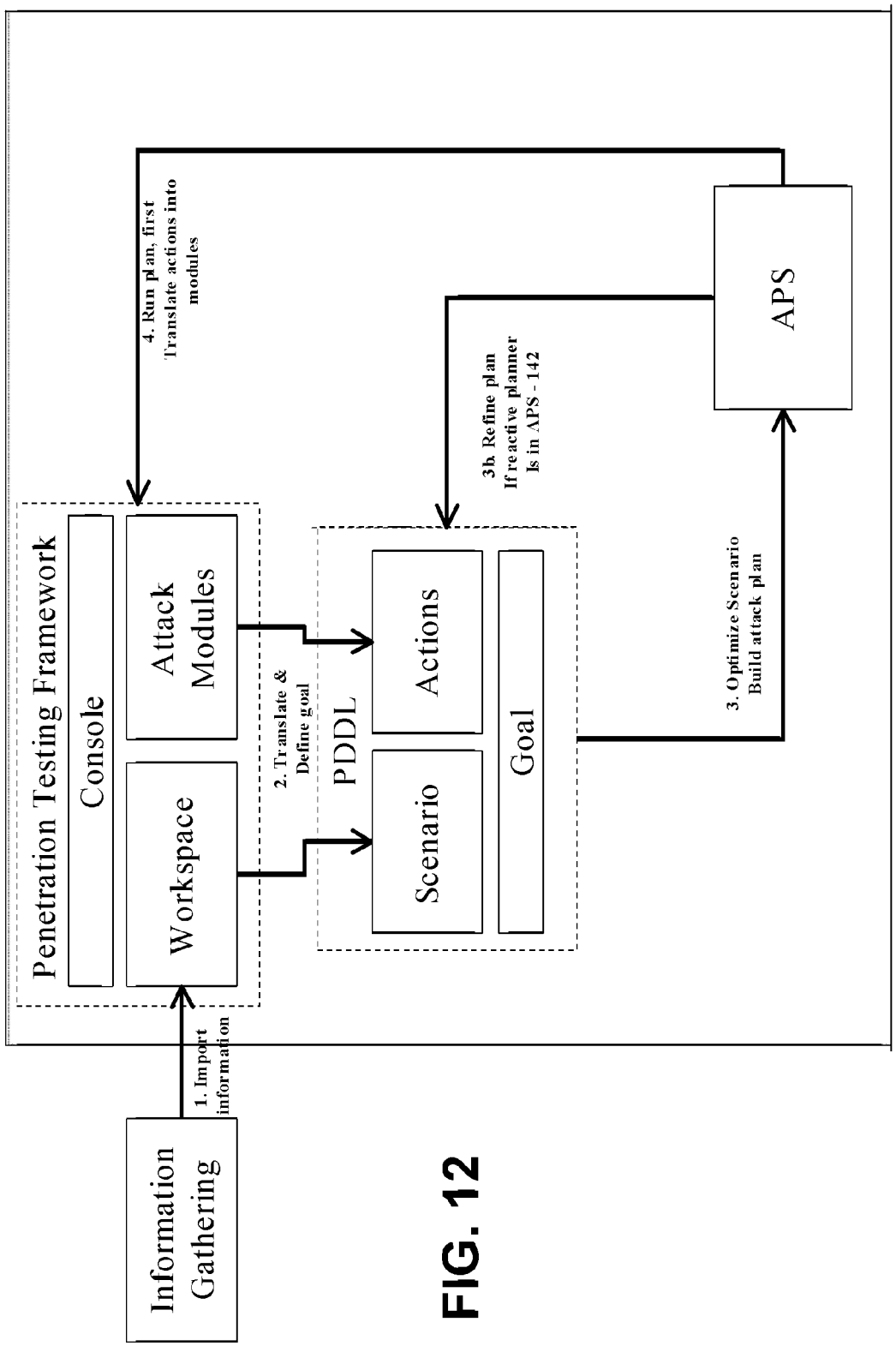
FIG. 12 also provides a logical diagram illustrating logic involved in the automated penetration testing process.

FIG. 12 also provides a logical diagram illustrating logic involved in the automated penetration testing process. Reference may be made to both FIG. 11 and FIG. 12 for the following description.

As shown by block 202, information regarding the target network is first collected. One example of how this can be achieved is by performing a Rapid Penetration Test Information Gathering process, as described in U.S. patent application Ser. No. 12/102,482, entitled, "System and Method for providing network penetration testing," filed Apr. 14, 2008, which is incorporated herein by reference. Another information collecting process that may be used includes using a connector to a third-party Information Gathering tool such nmap, Nessus, QualysGuard, or other tools.

As shown by block 204, the information gathered is imported into the workspace 55 by the penetration testing framework module 100. As shown by block 206, the scenario translator 130 translates the data in the workspace 55 into the target network description 132 of the PDDL scenario 130. This process has been described in detail above. In addition to translating the workspace 55, the set of penetration modules 102 are translated into PDDL actions 133 (block 208). In the example provided herein, the translation of the workspace into PDDL scenario is used and it specifies all the known information about the target network, including but not limited to, hosts, operating systems running in each host, operating system version, operating system edition, operating system build, operating system service pack, operating system distribution name, operating system kernel version, connections between hosts, types of the connections, and open ports, among other relevant information that can be collected through an information gathering process.

As shown by block 210, a goal to be achieved is then defined by the human user or automatically by an external module that is not part of this invention. The PDDL scenario, including the network description 132, available actions 133, and goal 134 are then sent to the attack plan solver module 140 (block 212). The pre-planner processor module 141 then modifies the received PDDL scenario to optimize its processing by the planner module 142, as previously described (block 214).

As shown by block 216, the optimized PDDL scenario is then received by the planner module 142 which creates the plans. The plans are then sent to the post-planner processor module 143 which executes the plans and updates the scenario based on execution results (block 218). This can be done either by executing all of the actions and then updating, or by updating after each action is executed. The update is done by calling the scenario translator 130 and importing the (now modified) workspace to the scenario 130—which will capture the changes made after each action is executed. If the goal is achieved, the automated penetration testing process is complete. Alternatively, if the goal is not complete, another plan is calculated by the planner module 142. In this case, the post-planner may select to do one of several things to ensure that the next plan achieves the goal. This may be, for example, removing the actions that failed, or looking for alternative actions that have the same effects as the actions that failed and executing them, or by interacting with the knowledge base to update its contents.

A possible example of a PDDL description of the scenario follows:

```
(define (problem attack_problem1)
    (:domain CyberAttack)
(:objects
    H-localhost - host
    H-192_168_56_102 - host
    H-192_168_56_102-192_168_100_2-host
    A-localagent - agent
    net_56 - network
    net_100 - network
)
(:init
    ;Host/localhost
    (has_architecture H-localhost I386)
    (connected_to_network H-localhost net_56)
    ;Host/192.168.56.102
    (has_architecture H-192_168_56_102 I386)
    (has_service H-192_168_56_102 dns)
    (has_service H-192_168_56_102 http)
    (has_service H-192_168_56_102 imap2)
    (has_service H-192_168_56_102 imaps)
    (has_service H-192_168_56_102 microsoft-ds)
    (has_service H-192_168_56_102 netbios-ssn)
    (has_service H-192_168_56_102 pop-3)
    (has_service H-192_168_56_102 ssh)
    (has_service H-192_168_56_102 status)
    (has_service H-192_168_56_102 sunrpc)
    (TCP_listen_port H-192_168_56_102 port22)
    (TCP_listen_port H-192_168_56_102 port53)
    (TCP_listen_port H-192_168_56_102 port80)
```

```
    (TCP_listen_port H-192_168_56_102 port110)
    (TCP_listen_port H-192_168_56_102 port111)
    (TCP_listen_port H-192_168_56_102 port113)
    (TCP_listen_port H-192_168_56_102 port139)
    (TCP_listen_port H-192_168_56_102 port143)
    (TCP_listen_port H-192_168_56_102 port445)
    (TCP_listen_port H-192_168_56_102 port548)
    (TCP_listen_port H-192_168_56_102 port612)
    (TCP_listen_port H-192_168_56_102 port622)
    (TCP_listen_port H-192_168_56_102 port993)
    (UDP_listen_port H-192_168_56_102 port53)
    (UDP_listen_port H-192_168_56_102 port111)
    (UDP_listen_port H-192_168_56_102 port619)
    (connected_to_network H-192_168_56_102 net_56)
    (connected_to_network H-192_168_56_102 net_100)
    ;Host /192.168.56.102/192.168.100_2
    (has_architecture H-192_168_56_102-192_168_100_2 I386)
    (has_service H-192_168_56_102-192_168_100_2 http)
    (has_service H-192_168_56_102-192_168_100_2 https)
    (has_service H-192_168_56_102-192_168_100_2 loc-srv)
    (has_service H-192_168_56_102-192_168_100_2 microsoft-ds)
    (has_service H-192_168_56_102-192_168_100_2 msrpc)
    (has_service H-192_168_56_102-192_168_100_2 netbios-ssn)
    (has_service H-192_168_56_102-192_168_100_2 smtp)
    (TCP_listen_port H-192_168_56_102-192_168_100_2 port25)
    (TCP_listen_port H-192_168_56_102-192_168_100_2 port80)
    (TCP_listen_port H-192_168_56_102-192_168_100_2 port135)
    (TCP_listen_port H-192_168_56_102-192_168_100_2 port139)
    (TCP_listen_port H-192_168_56_102-192_168_100_2 port443)
    (TCP_listen_port H-192_168_56_102-192_168_100_2 port445)
    (UDP_listen_port H-192_168_56_102-192_168_100_2 port135)
    (connected_to_network
    H-192_168_56_102-192_168_100_2 net_100)
    (installed A-localagent H-localhost)
    (has_architecture H-localhost I386)
    (has_OS H-localhost Windows)
    (has_OS_version H-localhost Win7)
    (has_OS_edition H-localhost Unknown)
    (has_OS_servicepack H-localhost Sp0)
    (has_architecture H-192_168_56_102 I386)
    (has_OS H-192_168_56_102 Linux)
    (has_OS_distro H-192_168_56_102 Ubuntu)
    (has_OS_version H-192_168_56_102 V_6_06)
    (has_kernel_version H-192_168_56_102 Unknown)
    (has_architecture H-192_168_56_102-192_168_100_2 I386)
    (has_OS H-192_168_56_102-192_168_100_2 Windows)
    (has_OS_version H-192_168_56_102-192_168_100_2
    Win2000)
    (has_OS_edition H-192_168_56_102-192_168_100_2
    AdvancedServer)
    (has_OS_servicepack H-192_168_56_102-192_168_100_2 Sp3)
    (= (time) 0)
)
(:goal (compromised H-192_168_56_102-192_168_100_2))
    (:metric MINIMIZE (time))
)
```

Figure 13:
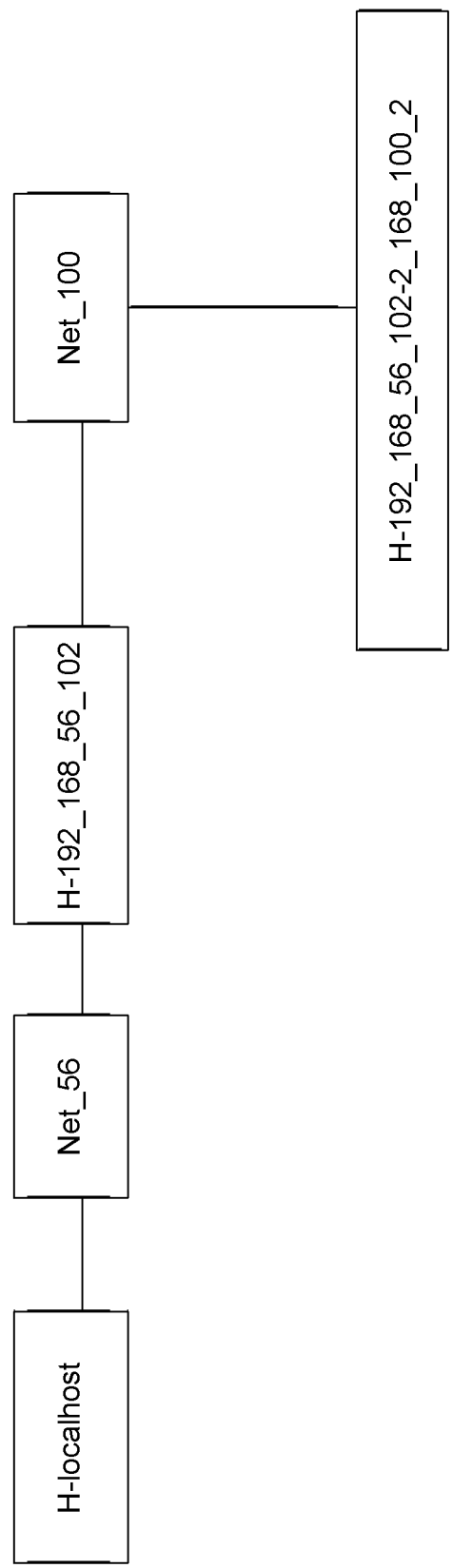
FIG. 13 is a schematic diagram illustrating an exemplary network.

In the :objects section inside the PDDL definition of the example scenario there are three hosts defined, named H-localhost (where the penetration test process starts), H-192_168_56_102 and H192_168_56_102-192_168_100_2, a network agent called A-localagent and two networks, net_56 and net_100. There is also a global variable named time. The :objects section is followed by the :init section, which sets up the scenario. In the example, we can identify the properties of the hosts defined through predicates. For example host H-localhost is connected to network net_56 and host H-192_168_56_102 is connected to networks net_56 and net_100. Therefore, host H-192_168_56_102-192_168_100_2 is reachable from H-localhost if and only if host H-192_168_56_102 is compromised first. Open ports and operating system details are also described in the scenario. The network can be illustrated as shown by FIG. 13.

Host H-192_168_56_102 has two network interfaces connected to different networks. The name of the "inner" host H-192_168_56_102-192_168_100_2 describes its network address is 192.168.100.2 and in the visibility view (from the H-localhost point of view) compromising H-192_168_56_102 is necessary to access host H-192_168_56_102-192_168_100_2.

Finally, the :goal section defines the goal the planner has to reach and plan actions for. In the example, the goal is to compromise host H-192_168_56_102-192_168_100_2 (i.e., install a remote agent in this host) and the metric to minimize (if using a planner with numerical effects) is the time variable.

The modules available in the Penetration Testing Framework are also translated into PDDL in a one-time process; and when the modules are updated or added, the PDDL must be modified as well. For each module there corresponds documented preconditions that must be satisfied in order to run and the effects caused to the scenario and the affected host after running it. These modules will be the actions available to the planner. An example PDDL version of a module (an action in PDDL) follows:

```
(:action
EXPLOIT_MSRPC-LLSSRV-Buffer-Overflow-exploit
    :parameters (?s - host ?t - host)
    :precondition (and
                (compromised ?s
                (and (has_OS ?t Windows)
                    (has_OS_edition ?t AdvancedServer)
                    (has_OS_servicepack ?t Sp3)
                    (has_OS_version ?t Win2000)
                    (has_architecture ?t I386)
                )
            (has_service ?t microsoft-ds)
            (has_service ?t netbios-ssn)
            (or        (TCP_connectivity ?s ?t port139)
                    (TCP_connectivity ?s ?t port445))
            )
    :effect(and
            (increase (time) 8)
            (installed_agent ?t high_privileges)
))
```

This definition can be read: EXPLOIT_MSRPC-LLSSRV-Buffer-Overflow-exploit action can be run from source host s against target host t if and only if: host s is compromised, host t is running Windows 2000 Advanced Server SP3 over an i386 platform, has running services Microsoft DS and Netbios SSN and there is TCP connectivity from host s to host t either on port 139 or 445. The effects of running this action against host t are: target host t will have a high-privilege agent running and run-time variable will be increased in 8 units.

Once a PDDL representation of the network is built, including hosts, attributes of the hosts and connectivity between hosts we proceed with the goal definition. This is a specific goal that the planner will try to reach by analyzing the scenario and the available actions (modules). The goal must be describable in terms of the scenario components (hosts and connections) and domain constraints (e.g., desired effects). For example "compromise host 192.168.100.2" can be expressed in PDDL:

```
(:goal    (compromised H-192_168_56_102-192_168_100_2))
        (:metric MINIMIZE (time))
)
```

The next step is to instantiate the APS. The planner takes the scenario and the goal and calculates an ordered sequence of actions to be executed in the Penetration Testing Framework. The following is an example of the output for a proactive planner (single-plan):

step 0: Mark_as_compromised A-localagent H-localhost
1: IP_connect H-localhost H-192__168__56__102
2: TCP_connect H-localhost H-192__168__56__102 port445
3: EXPLOIT_MSRPC-Samba-Command-Injection-exploit H-localhost H-192__168__56__102
4: Mark_as_compromised H-192__168__56__102 low_privileges
5: IP_connect H-192__168__56__102 H-192__168__56__102-192__168__100__2
6: TCP_connect H-192__168__56__102 H-192__168__56__102-192__168__100__2 port445
7: EXPLOIT_MSRPC-LLSSRV-Buffer-Overflow-exploit H-192__168__56__102 H-192__168__56__102-192__168__100__2
8: Mark_as_compromised H-192__168__56__102-192__168__100__2 high_privileges Each step of the sequence produces a result needed in order to execute the subsequent steps. The APS can detect whether any step has not produced the expected output and stop the plan, adding new constraints or removing actions from the scenario and calculating a new plan.

The cycle can then start over by determining a new goal with the scenario modified after running the sequence of actions calculated by the planner.

It should be emphasized that the above-described embodiments of the present invention are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

We claim:

1. A method for extending automated penetration testing of a target network comprising, the steps of:
   a. computing a scenario, wherein the step of computing the scenario comprises the steps of
      i. translating a workspace having at least one target computer in the target network, to a planning definition language;
      ii. translating penetration modules available in a penetration testing framework to the planning definition language; and
      iii. defining a goal in the target network and translating the goal into the planning definition language;
   b. building a knowledge database with information regarding the target network, properties of hosts in the network, parameters and running history of modules in the penetration testing framework; and
   c. running an attack plan solver module, wherein the attack plan solver module performs the steps of:
      i. running an attack planner using the scenario as input, to produce at least one attack plan that achieves the goal; and
      ii. executing actions defined in the at least one attack plan against the target network from the penetration testing framework.

2. The method of claim 1 wherein, prior to running the attack plan solver module, a pre-planner processor module is run using the scenario as input to produce a new scenario, wherein the pre-planner processor module parses the scenario to remove actions that cannot be executed against the hosts described in the scenario.

3. The method of claim 1 wherein, prior to running the attack plan solver module, a pre-planner processor module is run using the scenario as input to produce a new scenario, wherein the pre-planner processor module parses the scenario to combine into a single asset all those assets that can be targeted by the same actions and pose the same preconditions for these actions.

4. The method of claim 1 wherein, prior to running the attack plan solver module, a pre-planner processor module is run using the scenario as input to produce a new scenario, wherein the pre-planner processor module parses the scenario to combine into a single action all those actions that can be used to compromise a previously specified asset.

5. The method of claim 1 wherein the attack planner is selected from the group consisting of a proactive planner, a reactive planner, and a custom planner.

6. The method of claim 1, where the attack planner solver module, after computing the attack plan, executes a post-planner processor module, wherein the post-planner processor module runs an iterative process comprising the steps of:
   i. executing the first action in the plan;
   ii. monitoring the result of the first action in the workspace to ascertain if the effect predicted by the attack plan was successful; and
   iii. in case the action failed, modifying the scenario to produce a modified scenario, and calling the attack planner to re-calculate a modified plan with the modified scenario.

7. The method of claim 1 wherein an end user defines the goal to be achieved by the system.

8. The method of claim 1, wherein the actions defined in the attack plans by the attack plan solver module are run in parallel when the preconditions for these actions are satisfied and as limited by the penetration testing framework.

9. The method of claim 1, wherein the attack plan solver module updates the knowledge base after each action is executed.

10. The method of claim 1, wherein the planning definition language is a planning domain definition language.

11. The method of claim 1 wherein the attack plan softer module comprises a pre-planner processor module that uses information available in the knowledge database and the scenario, which is in the planning definition language, to modify the scenario.

12. The method of claim 11 wherein the attack plan solver module further comprises a planner processor module and a post-planner processor module, the method further comprising:
   sending the modified scenario from the pre-planner processor module to the planner processor module,
   computing a single plan at the planner processor module, and
   calling from the post-planner processor module a plan translator and executing each step of the single plan using the penetration testing framework.

13. The method of claim 11 wherein the attack plan solver module further comprises a planner processor module and a post-planner processor module, the method further comprising:
   sending the modified scenario from the pre-planner processor module to the planner processor module;
   computing different plans at the planner processor module; and executing the different plans in parallel using the penetration testing framework until the goal is reached by one of the plans.

14. The method of claim 11 wherein the attack plan solver module further comprises a planner processor module and a post-planner processor module, the method further comprising:

sending the modified scenario from the pre-planner processor module to the planner processor module;

computing a first plan with the planner processor module;

forwarding the first plan to the post-planner processor module, which starts executing each step of the first plan by calling a plan translator to translate the first plan into commands of the penetration testing framework; and monitoring with the planner processor module when new information is updated in the scenario.

15. The method of claim 1 wherein the computed scenario is in the planning definition language and wherein running the attack planner using the scenario as input comprises using the computed scenario in the planning definition language to produce at least one attack plan that achieves the goal.

* * * * *